(No Model.)
T. M. FOOTE.
GALVANIC BATTERY.
No. 377,745. Patented Feb. 14, 1888.
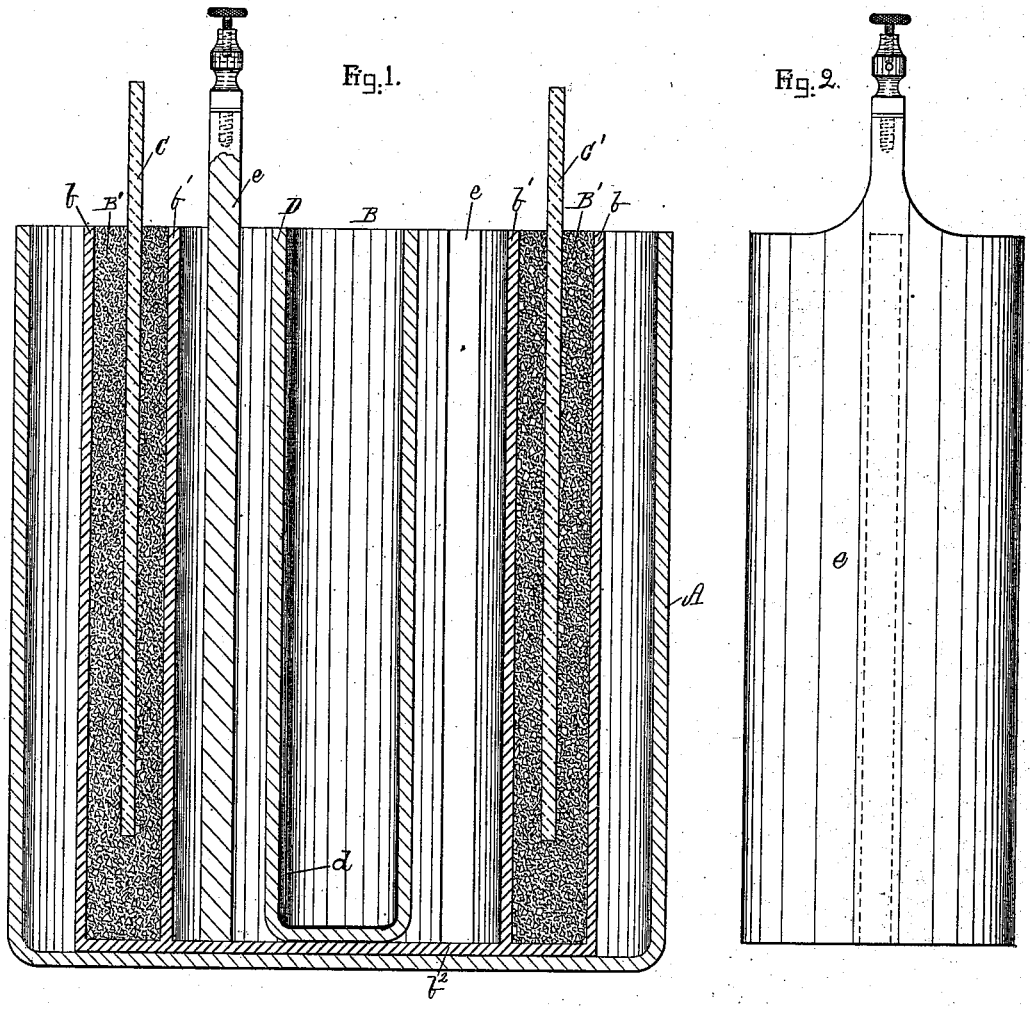
Witnesses.
Laurits W. Nolan.
John R. Snow.
Inventor.
T. M. Foote.
by J. E. Maynadier.
Atty.

UNITED STATES PATENT OFFICE.

THEODORE M. FOOTE, OF BOSTON, MASSACHUSETTS, ASSIGNOR OF FIFTY-ONE ONE-HUNDREDTHS TO SAMUEL T. HOLMES, OF SAME PLACE.

GALVANIC BATTERY.

SPECIFICATION forming part of Letters Patent No. 377,745, dated February 14, 1888.

Application filed July 6, 1887. Serial No. 243,587. (No model.)

*To all whom it may concern:*

Be it known that I, THEODORE MARSHALL FOOTE, of Allston, (part of Boston,) in the county of Suffolk and State of Massachusetts, have invented an Improved Galvanic Battery, of which the following is a description, reference being had to the accompanying drawings, in which—

Figure 1 is a diametrical section of the battery embodying my invention. Fig. 2 is an elevation of the zinc cylinder.

My invention relates to the application of sulphuric acid and water; and it consists, mainly, in separating them by means of a porous cup, as will now be more fully explained.

In the drawings, A is the containing-vessel, of any suitable construction.

B is a vessel so shaped as to form an annular chamber, B'. In practice I have had it made in the form of two concentric cylinders, $b\ b'$, in one piece, with a single bottom, $b^2$; but, as will be obvious, $b\ b^2$ may be one vessel, and a second vessel of smaller diameter may be used instead of $b'$. Both $b$ and $b'$ are porous, as will be understood by all skilled in the art.

D is a porous cup, and $e$ is the zinc cylinder, of usual construction.

The annular chamber B' is filled with broken carbon, the pieces being small enough to pack into the annular chamber and support the carbon electrodes C C'. The porous cell D is filled with commercial sulphuric acid, and the cylinder $b'$ is filled with water. The ordinary bichromate of-potash solution is used in the annular space between the cylinder $b$ and the inner surface of the containing-vessel A. Proper binding-posts are attached, in the usual way, to the zinc and carbon, and I prefer to use two projecting pieces of carbon, C C'; but they are connected by a stud of copper wire, and form, in fact, but one electrode, thus, as will be clear, reducing the resistance. Of course three or more projecting pieces may be used; but practically two will answer as well as a greater number.

I consider it desirable to use a porous cell having a non-porous bottom, and advise the use of one of these well-known cells in my battery. Cell D is readily made non-porous at the bottom by coating the bottom $d$ with asphalt or the like. An ordinary porous cup, however, will answer.

The operation will be clear without detailed description, the advantages being great steadiness and high electro-motive force and long-continued action. My theory is that the long service of my battery without material reduction of its electro-motive force is due mainly to the isolation of the sulphuric acid by means of the porous cup; but whatever may be the correct theory, I have used my battery for several hundred hours, the circuit being closed all the time, and have found the current practically the same during the whole time. When the acid is spent so that the current becomes weak, the water and acid are removed from the cup D and the cylinder $b'$, and a fresh supply of acid is put into the cup D and the water in the cylinder $b'$, when the battery is as good as before without replenshing the bichromate-of-potash solution, a single charge of bichromate-of-potash solution sufficing for several charges of sulphuric acid and water.

I have shown the carbon packed between two concentric cylinders closed at their inner ends; but this will be clear as a matter of convenience, in order that I may use carbon crushed into small pieces, or even in the form of a coarse powder; and it will be obvious that the vessel $b\ b'\ b^2$ might be made wholly of carbon, but for the practical difficulties of constructing a vessel to receive the water wholly of carbon. The object is of course to separate the bichromate-of-potash solution from the water, and this is best done in practice by using a porous vessel of the shape shown in the drawings, $b\ b'\ b^2$.

What I claim as my invention is—

The improved battery above described, consisting of the cup D, containing sulphuric acid, with a water-space about it, the zinc being in that water-space surrounded by the carbon with the bichromate-of-potash solution surrounding the carbon, all substantially as described.

THEODORE M. FOOTE.

Witnesses:
J. E. MAYNADIER,
EDWARD S. BEACH.